(12) United States Patent
Strong

(10) Patent No.: US 12,132,177 B1
(45) Date of Patent: Oct. 29, 2024

(54) SYSTEMS, APPARATUS, AND PROCESSES FOR BATTERY RECYCLING

(71) Applicant: Interco Trading, Inc., Madison, IL (US)

(72) Inventor: Matthew Strong, Ellsworth, ME (US)

(73) Assignee: Interco Trading, Inc., Madison, IL (US)

( * ) Notice: Subject to any disclaimer, the term of this patent is extended or adjusted under 35 U.S.C. 154(b) by 0 days.

(21) Appl. No.: 17/454,296

(22) Filed: Nov. 10, 2021

Related U.S. Application Data

(63) Continuation of application No. 16/903,515, filed on Jun. 17, 2020, now abandoned.

(60) Provisional application No. 62/862,356, filed on Jun. 17, 2019.

(51) Int. Cl.
| | | |
|---|---|---|
| *H01M 10/54* | (2006.01) | |
| *B02C 23/10* | (2006.01) | |
| *B03C 1/30* | (2006.01) | |
| *H01M 10/0525* | (2010.01) | |

(52) U.S. Cl.
CPC ............. *H01M 10/54* (2013.01); *B02C 23/10* (2013.01); *B03C 1/30* (2013.01); *H01M 10/0525* (2013.01); *B02C 2201/06* (2013.01)

(58) Field of Classification Search
CPC ....... B02C 23/10; B02C 2201/06; B03C 1/30; H01M 10/0525; H01M 10/54
See application file for complete search history.

(56) References Cited

U.S. PATENT DOCUMENTS

| | | | |
|---|---|---|---|
| 2,567,542 A | | 9/1951 | Blake |
| 2,736,952 A | | 3/1956 | Sibley |
| 2,828,534 A | | 4/1958 | Pitts et al. |
| 2,977,007 A | | 3/1961 | Richardson et al. |
| 3,137,930 A | | 6/1964 | Smith |
| 3,152,504 A | | 10/1964 | Brown |
| 3,269,870 A | | 8/1966 | Abramson |
| 3,453,150 A | | 7/1969 | Murph et al. |
| 4,118,219 A | | 10/1978 | Elmore et al. |
| 4,384,683 A | | 5/1983 | Huwald et al. |
| 4,397,424 A | | 8/1983 | Zappa et al. |
| 4,604,564 A | | 8/1986 | Windisch et al. |
| 5,119,009 A | | 6/1992 | McCaleb et al. |
| 5,173,277 A | | 12/1992 | Montgomery et al. |
| 5,377,920 A | * | 1/1995 | Alavi ................ B03B 9/061 241/20 |
| 5,631,540 A | | 5/1997 | Nguyen |
| 5,707,015 A | | 1/1998 | Guthrie |
| 6,150,050 A | * | 11/2000 | Mathew ............. H01M 10/54 429/49 |
| 6,524,737 B1 | * | 2/2003 | Tanii ................. H01M 10/54 429/49 |
| 6,686,086 B1 | | 2/2004 | Martin et al. |
| 7,911,179 B2 | | 3/2011 | Nakanishi |
| 8,210,456 B2 | | 7/2012 | Stevens |
| 8,246,717 B1 | | 8/2012 | Smith et al. |

(Continued)

*Primary Examiner* — Michael McCullough
*Assistant Examiner* — Kalyanavenkateshware Kumar
(74) *Attorney, Agent, or Firm* — Stinson LLP

(57) ABSTRACT

Systems, apparatus, and methods for recycling battery cells and/or battery cell assemblies for metallurgical recovery. In some embodiments, the battery cells and/or battery cell assemblies can be discharged/deactivated, reduced to smaller pieces, thermally decomposed, and then sorted into different component materials.

25 Claims, 17 Drawing Sheets

(56) References Cited

U.S. PATENT DOCUMENTS

| | | | |
|---|---|---|---|
| 8,593,110 | B2 | 11/2013 | Cassidy |
| 8,696,785 | B2* | 4/2014 | Iida .................. C22B 23/00 |
| | | | 429/49 |
| 8,734,972 | B2 | 5/2014 | Maeba et al. |
| 9,000,731 | B2 | 4/2015 | Biskup |
| 9,246,338 | B2 | 1/2016 | Doring et al. |
| 9,281,703 | B2 | 3/2016 | Abd Elhamid et al. |
| 9,379,419 | B2 | 6/2016 | Krolak |
| 9,834,827 | B2 | 12/2017 | Wang et al. |
| 9,912,022 | B2 | 3/2018 | Dunagan et al. |
| 10,205,200 | B2 | 2/2019 | Ho et al. |
| 2010/0146761 | A1 | 6/2010 | Sloop |
| 2013/0065092 | A1* | 3/2013 | Maeba .................. B30B 9/321 |
| | | | 429/49 |

\* cited by examiner

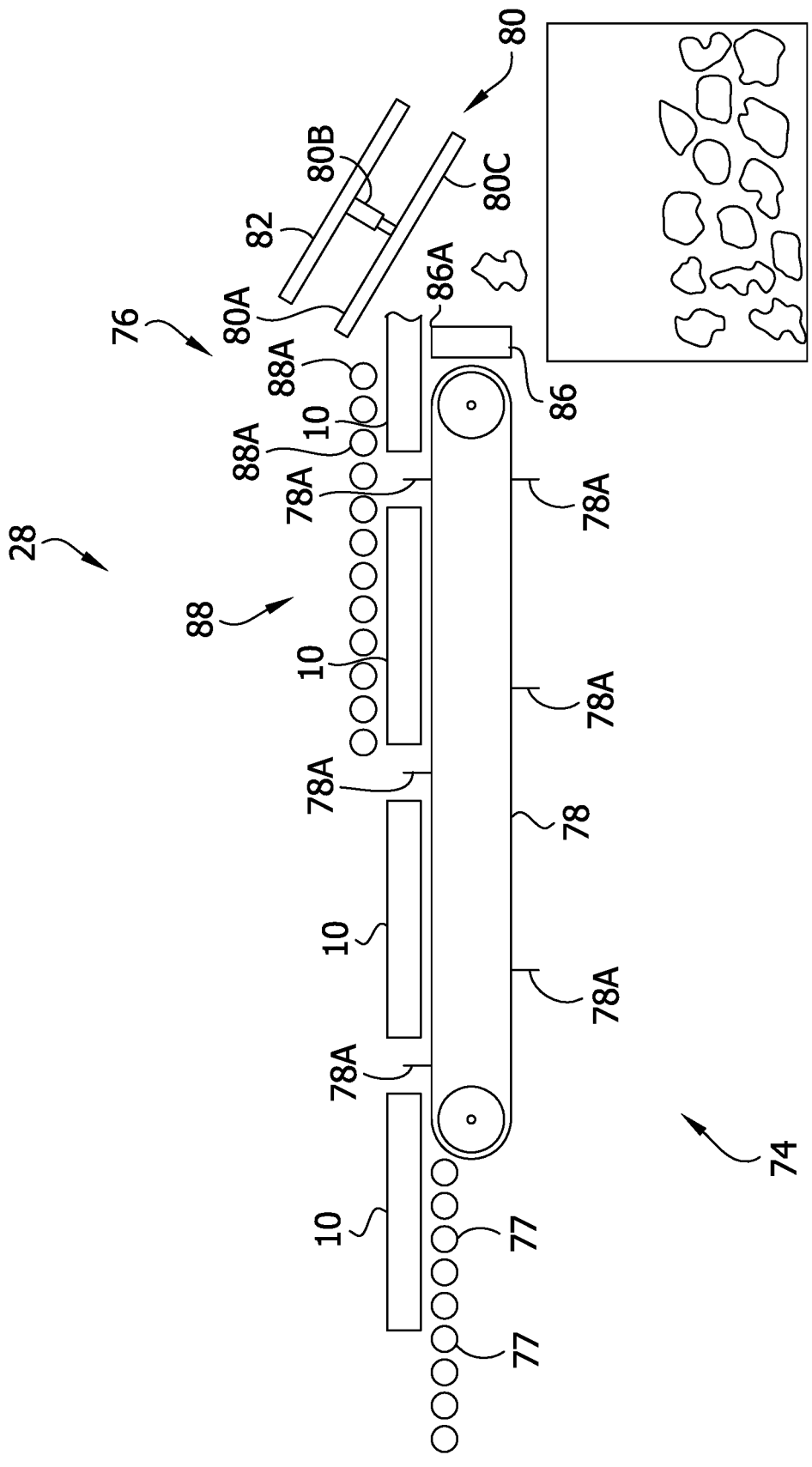

SYSTEMS, APPARATUS, AND PROCESSES FOR BATTERY RECYCLING

CROSS-REFERENCE TO RELATED APPLICATIONS

This application claims priority to U.S. application Ser. No. 16/903,515, filed on Jun. 17, 2020, which claims priority to U.S. Provisional Application No. 62/862,356, filed on Jun. 17, 2019, the entireties of which are hereby incorporated by reference.

FIELD

The present disclosure generally relates to battery recycling and more particularly to systems, apparatus, and processes for recycling batteries such as lithium ion batteries.

BACKGROUND

Batteries are used to power devices ranging from small toys to large vehicles. With the world's reliance on batteries continuing to increase, and the volume of batteries in production continuing to increase, proper disposal of batteries is becoming more important. Recycling can be used to dispose of batteries and components thereof in an environmentally friendly fashion.

SUMMARY

In one aspect, a method of recycling one or more battery cell assemblies each containing a plurality of battery cells comprises reducing a battery cell assembly into smaller pieces while keeping the battery cells of the battery cell assembly intact to retain electrolyte therein. The smaller pieces include the intact battery cells. The method also includes directing the smaller pieces to a furnace for burning off electrolyte in the battery cells, shredding a remainder of the smaller pieces from the furnace, and sorting the remainder by material type into different material groups.

In another aspect, a battery recycling system for recycling one or more battery cell assemblies each containing a plurality of battery cells comprises a battery cell assembly reducer configured to reduce a battery cell assembly into smaller pieces while keeping battery cells of the battery cell assembly intact to retain electrolyte therein. The smaller pieces include the intact battery cells. A shredder is configured to shred a remainder of the smaller pieces after the smaller pieces have passed through a furnace to burn off electrolyte from the battery cells. A sorter is configured to sort the remainder from the shredder by material type into different material groups.

In another aspect, a method for breaking down battery cell assemblies containing a plurality of battery cells comprises breaking apart the battery cell assemblies with a reducer to reduce the battery cell assemblies to smaller pieces. The breaking apart the battery cell assemblies is performed in a way to prevent breach of the battery cells to retain electrolyte in the battery cells.

In another aspect, a reducer for breaking down a battery cell assembly containing a plurality of battery cells comprises a fulcrum configured to support the battery cell assembly. A ram is configured to engage the battery cell assembly. The ram is movable between a retracted position and an extended position. The ram is configured to engage and break apart the battery cell assembly by flexing the battery cell assembly about the fulcrum when the ram moves from the retracted position toward the extended position. A ram driver is operatively coupled to the ram and is configured to move the ram toward the extended position.

In another aspect, a method of sorting pieces from batteries for recycling comprises separating fine particles from the pieces with one or more filters leaving a first remainder, separating plastics from the first remainder with a first sieve leaving a second remainder, separating metals from the second remainder with a second sieve leaving a third remainder, and collecting the third remainder.

Other objects and features will be in part apparent and in part pointed out hereinafter.

BRIEF DESCRIPTION OF THE DRAWINGS

FIG. 9 is a schematic side elevation of a reducer.

Corresponding reference characters indicate corresponding parts throughout the drawings.

DETAILED DESCRIPTION

Figure 1:
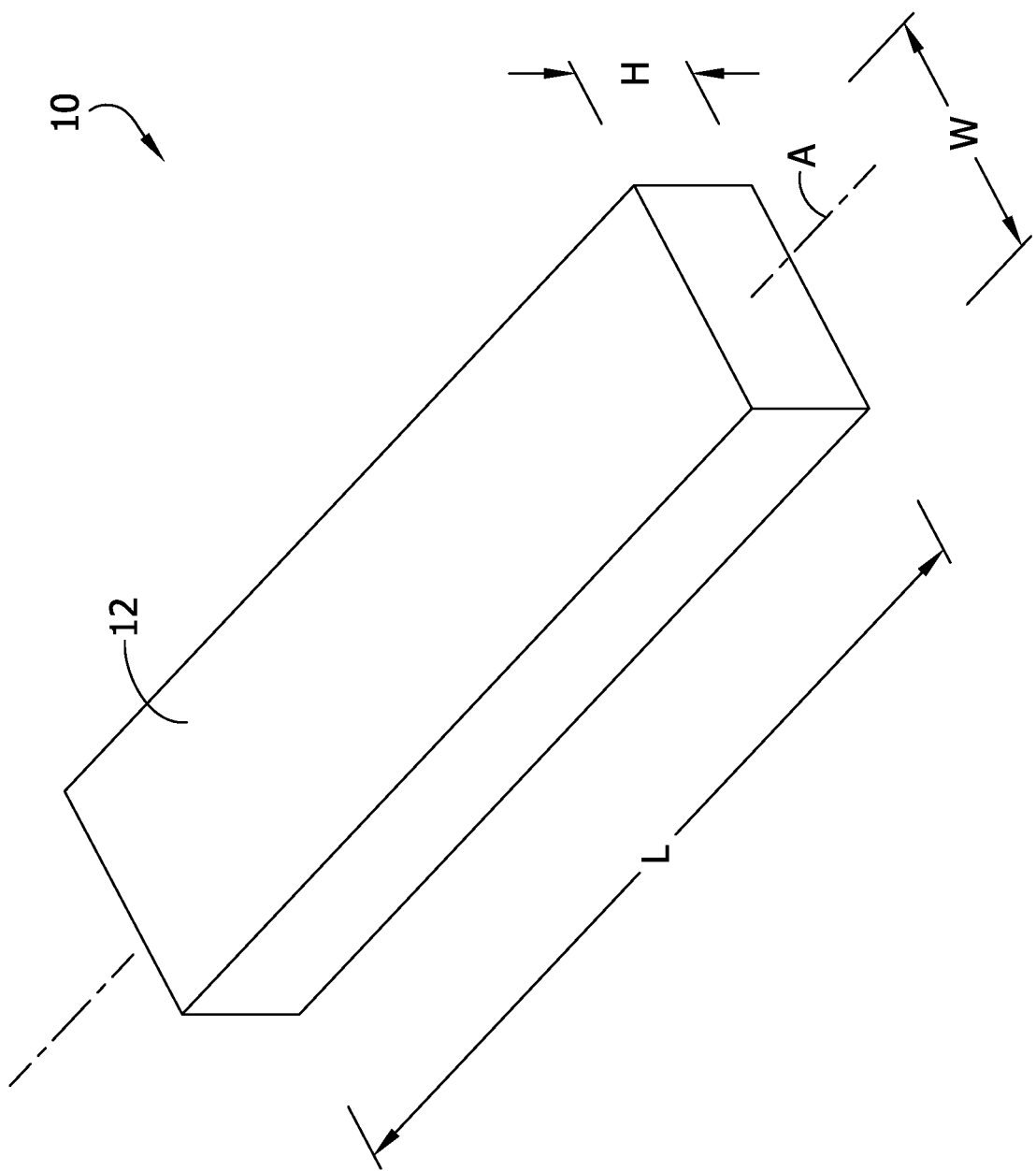
FIG. 1 is a perspective of a battery module.

Referring to FIG. 1 a battery module is designated generally by the reference number 10. The battery module can include a housing 12, such as a rigid plastic and/or metal shell, which supports or houses one or more battery cells. For example, the housing 12 may house ten to twenty battery cells or as many as six or nine hundred or a thousand or more battery cells. Desirably, the battery module 10 includes connection structure (not shown) that electrically connects some or all of the battery cells of the module, and the battery module includes electrical contacts (not shown) for placing the module and thus the cells in electrical connection with a device to be powered. The battery module 10 can include other components, such as additional cell support structure (e.g., inside the housing) or control devices, etc.

In the illustrated embodiment, the battery module 10 is generally rectangular in shape. The battery module has a length L extending between opposite front and rear ends of the module, a height H extending between upper and lower ends of the module, and a width W extending between opposite left and right sides of the module. The module 10 has a longitudinal axis A extending along the length of the module. Other sizes and shapes of battery modules can be used without departing from the scope of the present invention.

Figure 2:
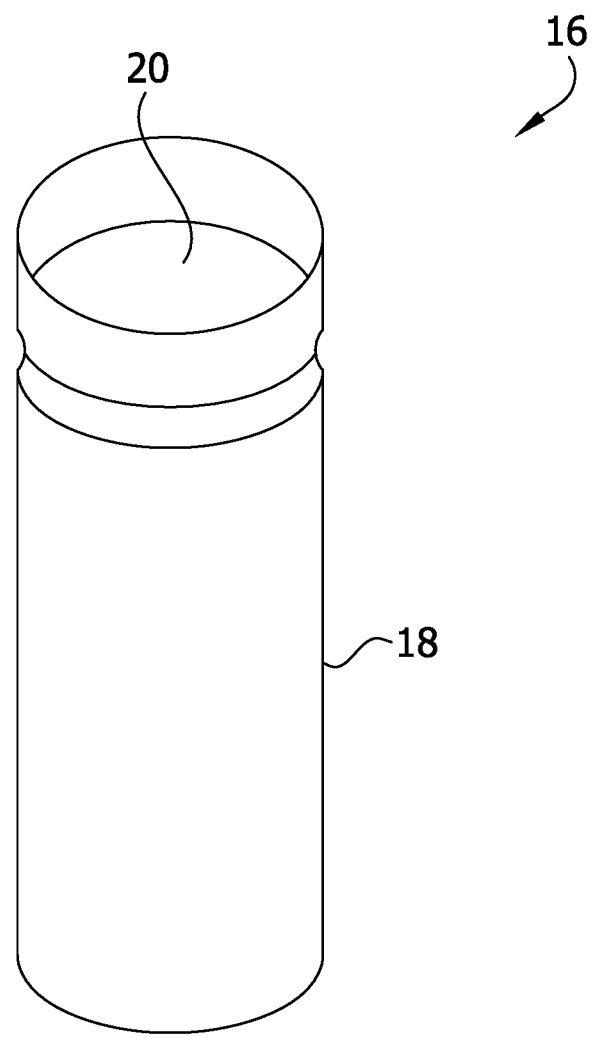
FIG. 2 is a perspective of a battery cell.

An example battery cell 16 that can be used in forming the battery module is shown in FIG. 2. The battery cell 16 includes a case 18 and a cap 20. Inside the case 18, the battery cell includes an anode, a cathode, and an electrolyte (not shown). The case 18 can be made of steel or another suitable metal or other material. The cap 20 can be made of aluminum or another suitable metal or other material. The case 18 serves as a first electrical contact (e.g., negative) of the cell 16 and the cap 20 serves as a second electrical contact (e.g., positive) of the cell. In manufacture, the anode and cathode are positioned in the case 18, and then the electrolyte is added to the case. When the electrolyte is added to the case 18, the cell 16 is "activated" and can hold a charge to be used to power a device. The cap 20 closes a mouth of the case to enclose the anode, cathode, and electrolyte. The internal components of the battery cell 16 can include various types of metal such as cobalt, nickel, manganese, copper, etc.

For example, the battery cell 16 could be a lithium ion battery cell, and the module 10 including multiple of the cells could be a lithium ion battery module for an electric vehicle. However, other types of battery cells and battery modules can be used, and for powering other types of devices, without departing from the scope of the present disclosure.

In manufacturing the battery cells 16 and the battery modules 10, numerous types of unusable production scrap might be produced, such as battery cell components, partially assembled battery cells, and fully assembled battery cells. Moreover, other unusable production scrap can include battery module components, partially assembled battery modules, and/or fully assembled battery modules. Partially assembled battery modules and fully assembled battery modules 10 or components thereof including multiple battery cells can be broadly referred to as multi-cell assemblies or battery cell assemblies including multiple battery cells. The production scrap needs to be disposed, and can be recycled according to the present disclosure. Moreover, battery cells 16 and battery modules 10 that are used and have reached an end of their service life (e.g., post-consumer battery cells or battery modules) also need to be disposed, and can be recycled according to the present disclosure.

Figure 3:
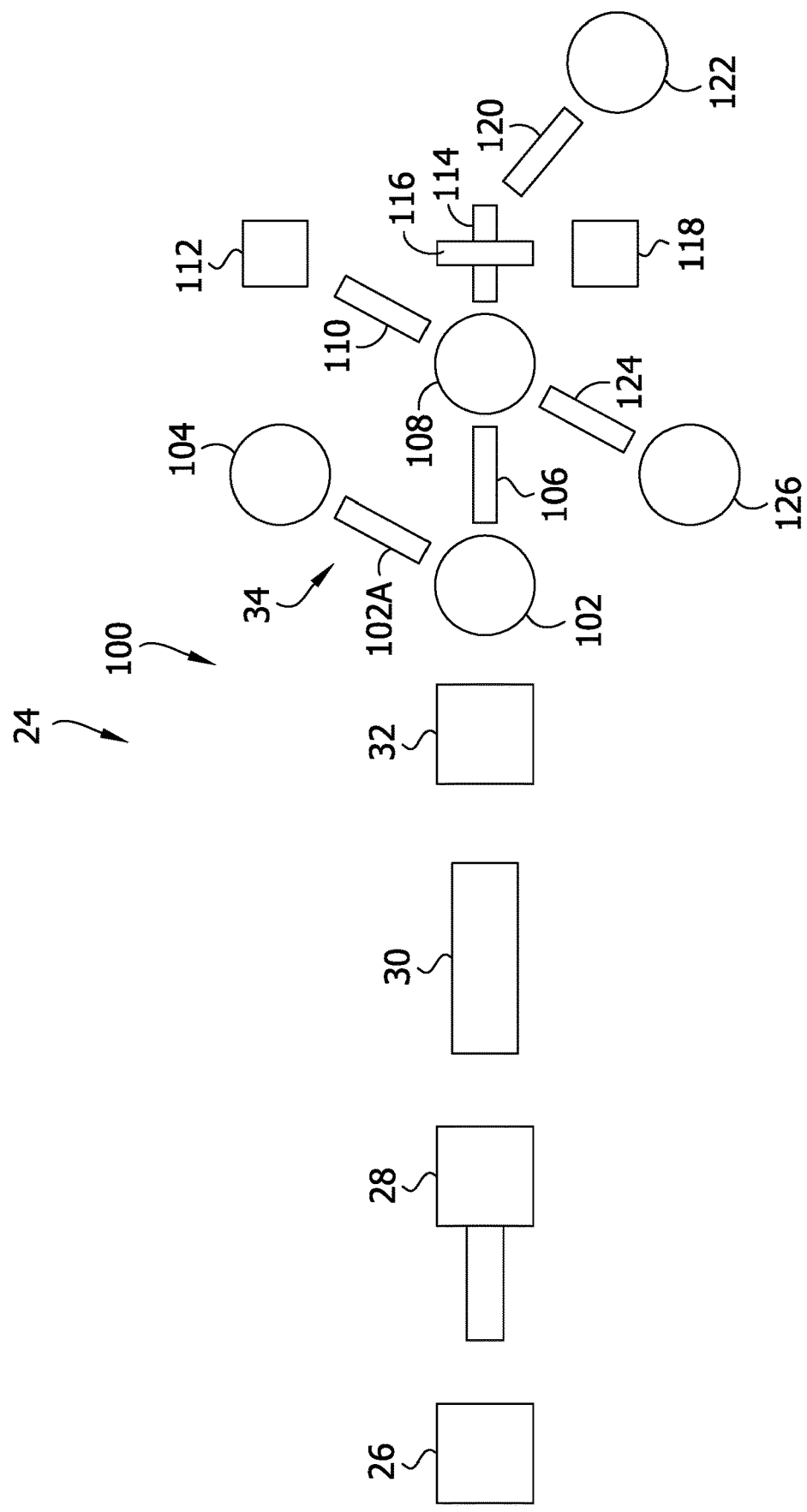
FIG. 3 is a schematic of a battery recycling system.
Figure 4:
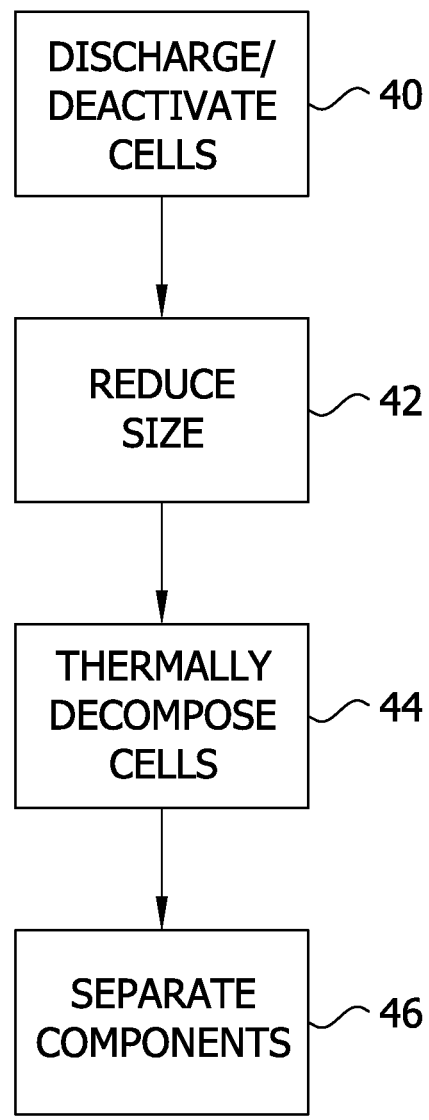
FIG. 4 is a flow diagram of a method of recycling battery cells, battery modules, or components thereof.

Referring to FIG. 3, a system for recycling battery cells 16, battery modules 10, or components thereof (e.g., battery cell components, multi-cell assemblies, etc.), for metallurgical recovery, is designated generally by the reference number 24. The recycling system 24 includes a cell deactivator 26 (e.g., discharger/deactivator), a reducer 28, a thermal decomposer 30, a shredder 32, and a separator 34. Referring to FIG. 4, in general, the system 24 is configured to perform the step 40 to discharge and/or deactivate cells, to perform the step 42 to reduce cell assemblies into smaller pieces, to perform the step 44 to thermally decompose cells, and to perform the step 46 to separate component materials of modules and cells, in an efficient manner at large scale.

To recycle the multi-cell assemblies 10 with the system 24, any multi-cell assemblies with a charge need to first be discharged with the cell deactivator 26. Any multi-cell assemblies 10 without a charge can bypass the cell deactivator and proceed to other components (e.g., reducer 28, furnace 30, shredder 32) of the system.

Figure 5:
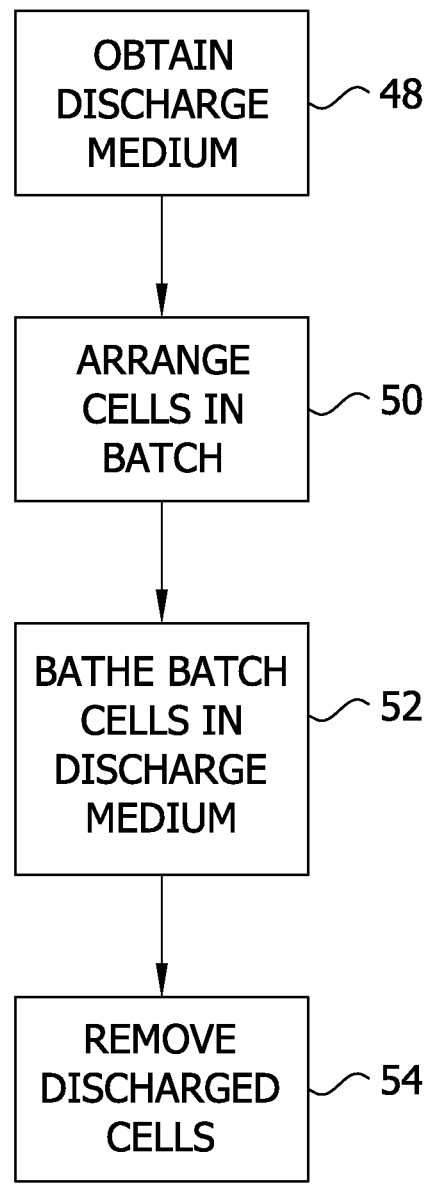
FIG. 5 is a flow diagram of a method of discharging and/or deactivating battery cells.

The cell deactivator 26 is configured to discharge the multi-cell assemblies 10. In one example, the deactivator 26 comprises an aqueous solution deactivator that deactivates the cells by bathing cells in a discharge medium (e.g., liquid or gel) for a time sufficient to drain the cells to cause deactivation of the cells rendering the cells unviable (e.g., no longer capable of holding a charge sufficient for normal use). As shown in FIG. 5, this can be done using a step 48 to obtain a discharge medium, a step 50 to arrange the cells in a batch, a step 52 to bathe the batch of cells in the discharge medium for a time sufficient to deactivate the cells, and a step 54 to remove the cells from the discharge medium. It will be appreciated that the cells 16 in this process could be part of a multi-cell assembly (e.g., partially or fully assembled battery module) or be a collection of unconnected or loose cells. Desirably, the discharge medium is electrically conductive such that when a cell 16 is immersed in the discharge medium, the discharge medium electrically connects the positive and negative contacts of the cell to cause the cell to discharge. Desirably, the discharge medium is configured to discharge the cells without causing breach of the cells 16. For example, a discharge medium that does not corrode the cap 20 or case 18 of the battery cell 16 is desirable. Corrosion of the cap 20 of the cell 16 can lead to breach of the cell and permit the electrolyte to escape the cell into the discharge medium, which may then present a hazard and be challenging to properly dispose. Other ways of discharging/deactivating the battery cells 16 can be used without departing from the scope of the present disclosure.

Figure 7:
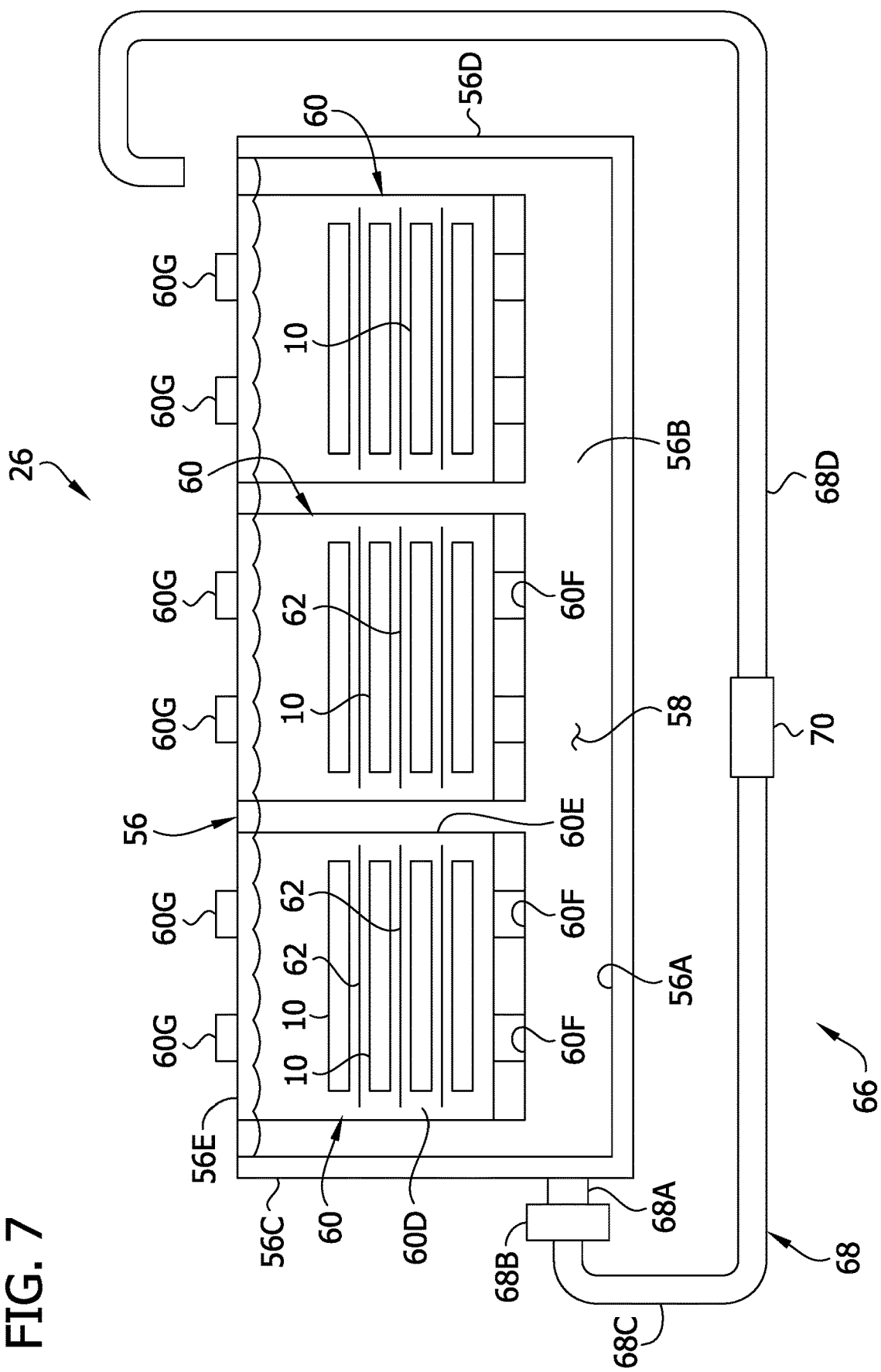
FIG. 7 is a side elevation of a basin having a side wall removed to show carriers with battery modules loaded in the basin.

An embodiment of a deactivator 26 for deactivating cells 16 is shown in FIG. 7. The deactivator 26 includes a basin 56 configured to hold a volume of the discharge medium 58. For example, the basin 56 can be a large metal open-topped container or reservoir sized to receive multiple batches of cells 16 to be deactivated. In FIG. 7, multiple batches of battery modules 10 are shown loaded on carriers 60 received in the basin 56. The basin 56 includes a bottom wall 56A, a front wall (not shown), a rear wall 56B, and left and right end walls 56C, 56D. The basin 56 has a rim 56E extending along upper ends of the front, rear, left and right walls, around a top opening of the basin 56. The basin 56 has a length extending between the left wall 56C and the right end wall 56D, a width extending between the front wall and rear wall 56B, and a height extending from the bottom wall 56A to the rim 56E. Desirably, the basin 56 is sized to receive multiple carriers 60 in a row extending along the length of the basin. In the illustrated embodiment, three carriers 60 are shown in a row, but other numbers, such as two, four, five, six, seven, or more carriers can be arranged in a row, without departing from the scope of the present disclosure. In the illustrated embodiment, the width of the basin 56 is selected to receive one row of carriers, but the reservoir could be sized to hold multiple rows (e.g., two, three, or more rows) of carriers.

Figure 6:
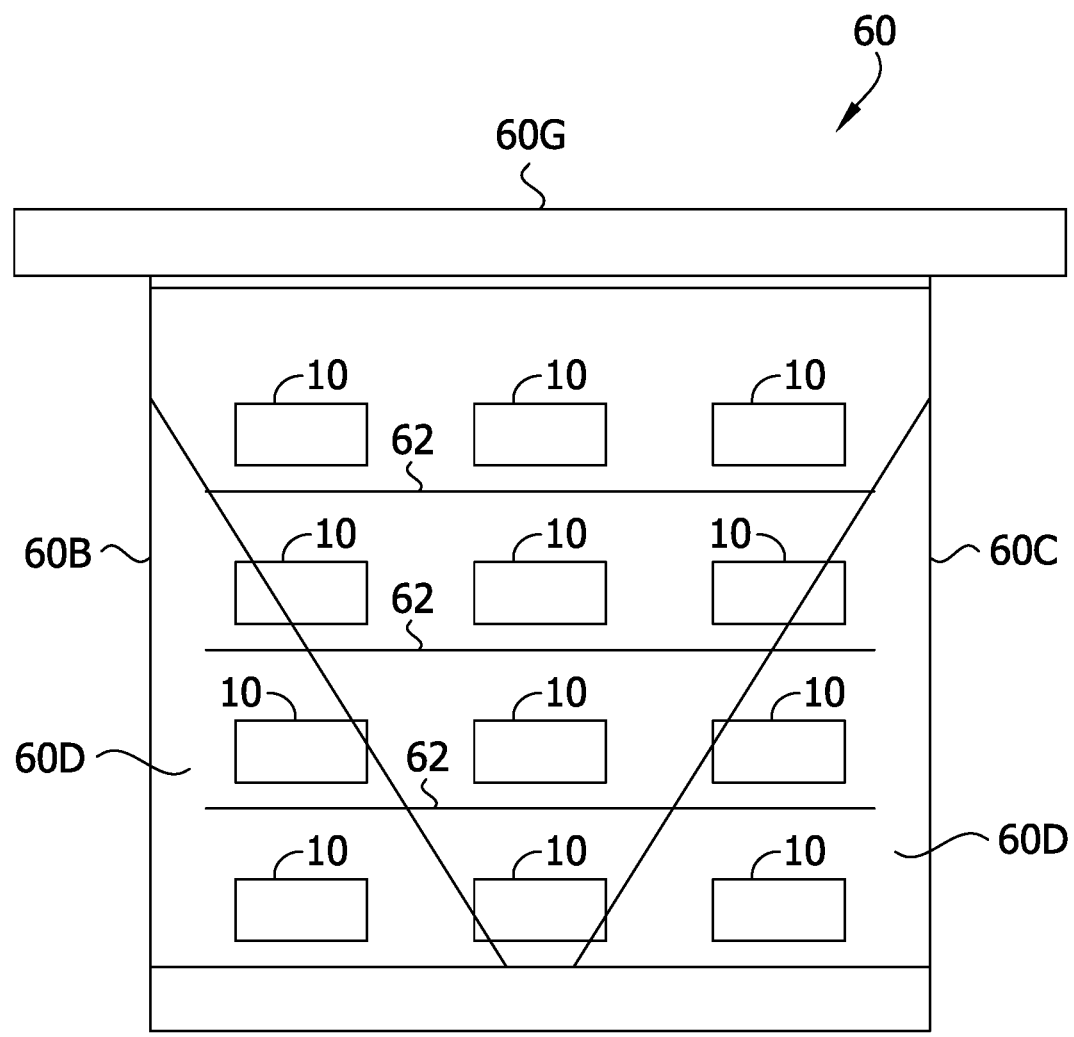
FIG. 6 is a side elevation of a carrier loaded with battery modules.

Referring to FIGS. 6 and 7, each carrier 60 is configured to hold multiple layers of modules 10, each layer including multiple modules arranged side-by-side. In the illustrated embodiment, four layers of three modules 10 each are loaded on the carriers. For example, the modules 10 can be loaded on the carriers 60 out of the basin 56, and the carriers can be moved into the basin after loading the modules thereon. Spacers 62 (e.g., plastic or metal sheets or members) can be provided between the layers to space modules 10 of adjacent layers away from each other. In the illustrated embodiment, each carrier 60 includes a base defining a bottom wall 60A of the carrier, left and right walls 60B, 60C extending upward from the base, and partial/angled front and rear walls 60D, 60E extending upward from the base. The left, right, front, and/or rear walls 60B-60E can be omitted without departing from the scope of the present disclosure. Desirably, the walls of the carrier 60 are configured to contain the modules 10 in the carrier but also to permit flow of the discharge medium therethrough. For example, the walls 60A-60E can be formed of grating or wire mesh, etc.

Desirably, the carriers 60 are configured to permit convenient movement thereof by equipment such as a forklift, skid steer, and/or pallet jack. In the illustrated embodiment, the base of the carrier includes a first pair of receivers 60F configured to receive spaced forks of a forklift or similar equipment for lifting and moving the carrier 60. Moreover, the carrier 60 includes a second pair of receivers 60G adjacent a top of the carrier configured to receive spaced forks of suitable moving equipment. For example, the receivers 60F, 60G can comprise metal tubing having rectangular cross section defining an interior sized to receive the forks. The receivers 60F, 60G can be secured to the body of the carrier 60 by welding, fastening, or another suitable method. For example, the receivers 60G can be secured to the body of the carrier 60 by chain. Not only do the receivers 60G serve as a convenient means for lifting the carrier 60, but the receivers can also be used as supports or hangers for suspending the carrier from the rim 56E of the basin 56 when the carrier is received in the basin. It will be appreciated that a forklift or similar piece of equipment can lift a carrier 60 via the receivers 60G, transport the carrier to the basin 56, lift the carrier, and lower the carrier into the basin until the receivers 60G rest on the rim 56E of the basin. The carrier 60 can then be left in the basin 56 for the time necessary to deactivate the cells 16, such as about 24 hours. When it is time to remove the carrier 60, the forklift engages the receivers 60G for removal of the carrier from the basin 56. Other types and configurations of carriers and basins can be used without departing from the scope of the present disclosure.

Referring to FIG. 7, while the carriers 60 are in the basin, the discharge medium 58 can be circulated using a circulation system 66. In the illustrated embodiment, the circulation system 66 includes plumbing 68 and a pump 70. The plumbing includes an inlet 68A connected to a lower end of the basin 56 at the left wall 56C. Adjacent the inlet 68A, the plumbing includes a valve 68B that can be opened/closed to permit flow therethrough. Downstream from the valve 68B, the plumbing includes a first conduit 68C extending to the pump 10. A second conduit 68D extends to an upper end of the basin 56 adjacent the right wall 56D. The pump 70 is configured to draw discharge medium 58 from the lower, left portion of the basin 56 and to pump the discharge medium to the upper, right portion of the basin. The arrangement is such that the circulation system 66 causes discharge medium 58 in the basin 56 to flow generally from the upper, right portion of the basin to the lower, left portion of the basin. Accordingly, discharge medium 58 flows generally uniformly over the cells 16 in the carriers 60. The discharge medium 58 may be heated by the discharging battery cells 16, and the circulation system 66 assists in dissipating the heat and reducing localized heat in the basin 56. It will be appreciated that the upper region of the discharge medium will generally be warmer due to heated discharge medium rising. The circulation system 66 draws relatively cool discharge medium from a lower portion of the basin 56 and introduces it to mix with heated discharge medium at the top of the basin. If the level of discharging medium 58 in the basin 56 reduces due to evaporation or other factors, additional discharging medium can be added. Desirably, the bathing of the cells 16 in the discharge medium 58 drains the cells to the extent the cells are no longer viable such that risk of fire or explosion in further processing of the cells is reduced.

Other types of discharge medium circulation systems can be used without departing from the scope of the present disclosure. Moreover, it will be appreciated that non-liquid or other types of discharge medium can be used for efficiently discharging and/or deactivating the cells in large scale.

The use of other types of deactivators (e.g., dischargers) are also within the scope of the present disclosure. For example, the deactivator can be a resistor load deactivator. In this embodiment, the resistor load deactivator includes a plurality of discharging circuits each configured to discharge a single module 10 (e.g., multi-cell assembly, battery cell 16). Each discharging circuit includes an interface (e.g., clips, clamps, plugs, connectors, compression battery terminals, battery lugs, etc.) to electrically couple to the module and one or more loads (e.g., resistors) to discharge the module. Each discharging circuit may also include a controller (e.g., switch) to control and/or monitor the discharging and a display to provide information related to the discharging (e.g., current, voltage, remaining battery capacity, power, etc.) to an operator. A plurality of discharging circuits can be arranged together in a bank to discharge a plurality of modules 10 at the same time. Each discharging circuit in the bank is discrete from the other discharging circuits. Other configurations can be used.

The recycling system 24 includes the reducer 28 for reducing the multi-cell assemblies 10 (or other components) to smaller pieces for further processing. The smaller pieces include the remnants of the multi-cell assemblies 10 such as the battery cells 16 and housing 12. Desirably, the reducer keeps the battery cells 16 intact when reducing the multi-cell assemblies 10. As explained in further detail below, cells 16 containing an electrolyte are desirably later subjected to thermal decomposition to burn off the electrolyte. This can be performed in a furnace 30 commonly known as a rotary kiln or calciner. Typical calciners are configured to receive relatively small pieces, so it may be necessary to reduce the multi-cell assemblies 10 into smaller pieces to prepare for thermal decomposing. Accordingly, by reducing the multi-cell assemblies 10, the reducer 28 releases at least some of the battery cells 16 from the module housing 12 (e.g., portions thereof), and desirably all of the cells. For example, the output of the reducer 28 may be individual cells and/or small clusters of cells, and broken components of the former module.

In the illustrated embodiment, the reducer 28 is configured to break the multi-cell assemblies 10 into smaller pieces by flexing the multi-cell assemblies. Specifically, the reducer 28 is configured to break the housing 12 of the multi-cell assemblies 10 apart. The reducer 28 includes a feeder 74 and a breaker 76. The feeder is configured to move the multi-cell assemblies 10 toward the breaker 76. In the illustrated embodiment, the feeder comprises a conveyor 74. The conveyor 74 includes a first section of rollers 77 onto which the multi-cell assemblies 10 are loaded. The conveyor 74 includes a second section including an endless loop belt 78. The belt 78 can include lugs 78A (e.g., paddles or ribs) configured to push the multi-cell assemblies 10 down the conveyor. The belt 78 is supported at opposite ends of the loop by rollers 80, one of which can be driven by a motor (not shown) to drive the belt. For example, the belt 78 can be operated to move at about 2 to 3 feet per minute or at a slower or faster rate. The belt 78 is configured to move the multi-cell assemblies 10 or other module components along a travel axis TA, which is usually parallel to the longitudinal axis A of the module 10 or module component on the belt 78, in a feed direction toward the breaker 76.

In the illustrated embodiment, the breaker 76 comprises a ram 80 configured to engage the multi-cell assemblies 10. The ram 80 includes a ram head 80A (e.g., rigid metal bar or plate, etc.) and a cylinder 80B. In the illustrated embodiment, the ram head 80A defines a ram surface 80C configured to engage the multi-cell assembly on the conveyor, and the ram surface is arranged to be angled at $\alpha 1$ between about 15 and 35 degrees with respect to the travel axis TA of the conveyor. The cylinder is arranged to extend the ram head toward the conveyor at an angle $\alpha 2$ between about 105 and 125 degrees with respect to the travel axis TA of the conveyor. The cylinder 80B can be hydraulic or pneumatic, etc. The ram 80 is mounted on a support such as a frame 82 to locate the ram with respect to the conveyor. The ram 80 is configured to extend and retract toward and away from the downstream end of the conveyor 74 to break the multi-cell assemblies 10 into smaller pieces. In one embodiment, the ram head 80A may pivot toward and away from the downstream end of the conveyor 74 to break the multi-cell assemblies 10 into smaller pieces. Other types of rams can be used without departing from the scope of the present disclosure. For example, the ram can be driven by gears, levers, or other suitable drive mechanisms or means.

To assist the ram 80 in breaking the multi-cell assemblies 10 into smaller pieces, the breaker 76 includes a fulcrum 86 and a backing or brace 88. The fulcrum 86 is configured to support the multi-cell assemblies 10 (e.g., the housings 12 of the modules). The fulcrum 86 can comprise a rigid structural member such as a plate, bar, tube, etc. that defines a location about which a multi-cell assembly bends when the ram 80 presses on the multi-cell assembly. The fulcrum 86 is located adjacent the downstream end of the conveyor 74. In the illustrated embodiment, the fulcrum 86 is a rigid bar having an edge 86A over which the multi-cell assembly 10 bends when the ram 80 presses against the multi-cell assembly. The backing 88 is positioned above and opposes the conveyor 74. The backing 88 braces the multi-cell assemblies 10. The backing 88 is configured to limit rotation of the multi-cell assemblies 10 about the fulcrum 86 when the ram 80 flexes the multi-cell assemblies about the fulcrum. Specifically, the backing 88 is configured to limit the rear end of the multi-cell assembly 10 from rising in response to the pressing of the ram 80. In the illustrated embodiment, the backing 88 comprises a plurality of rollers 88A arranged in a row above the downstream end of the conveyor 74. The rollers 88A can be rigidly mounted such that the rollers are fixed in position (e.g., vertically fixed position) to resist upward movement of the rear ends of the multi-cell assemblies 10. Accordingly, in the illustrated embodiment, the reducer 28 comprises a flex breaker. The ram 80 of the reducer 28 is configured to engage and break apart the multi-cell assemblies 10 by flexing the multi-cell assemblies about the fulcrum 86 when the ram moves from a retracted position toward an extended position. The pressing force of the ram 80 against the forward end of the multi-cell assembly 10 results in bending of the multi-cell assembly about the fulcrum 86 and fracturing of the multi-cell assembly near the fulcrum. The force of the ram 80 against the multi-cell assembly 10 flexes the assembly (imparting tension along a top of the multi-cell assembly and compression along the bottom of the multi-cell assembly) that desirably results in breaking or fracturing of the multi-cell assembly without breaching any of the cells 16. In other words, the housing 12 and/or other structural components of the assembly 10 fracture while the cells 16 remain substantially intact. Keeping the battery cells 16 intact prevents breach of the cells and prevents electrolyte contained within the cells from leaking out (e.g., prevent the exposure of electrolyte from the battery cells). This is desirable because the pieces from the reducer 28 may not immediately enter the furnace 30 and/or may need to be transported to the furnace, which burns off the electrolyte as described below. Keeping the battery cells 16 intact allows the battery cells to not pose a safety or environmental hazard while stored before being transferred to or while being transferred to the furnace 30. Other types and configurations of fulcrums and backings can be used without departing from the scope of the present disclosure. For example, the backing could comprise a plate or bar or other structural member instead of rollers. Moreover, the backing could be dynamic in that it adjusts upward and downward to accommodate multi-cell assemblies 10 of different dimensions or heights. The fulcrum could also be dynamic in that is moves upward and downward to accommodate multi-cell assemblies 10 of different dimensions or heights and/or to move upward in conjunction with the ram 80 to apply a greater degree of flex against the multi-cell assemblies. Other types of breakers could also be used.

Figure 8:
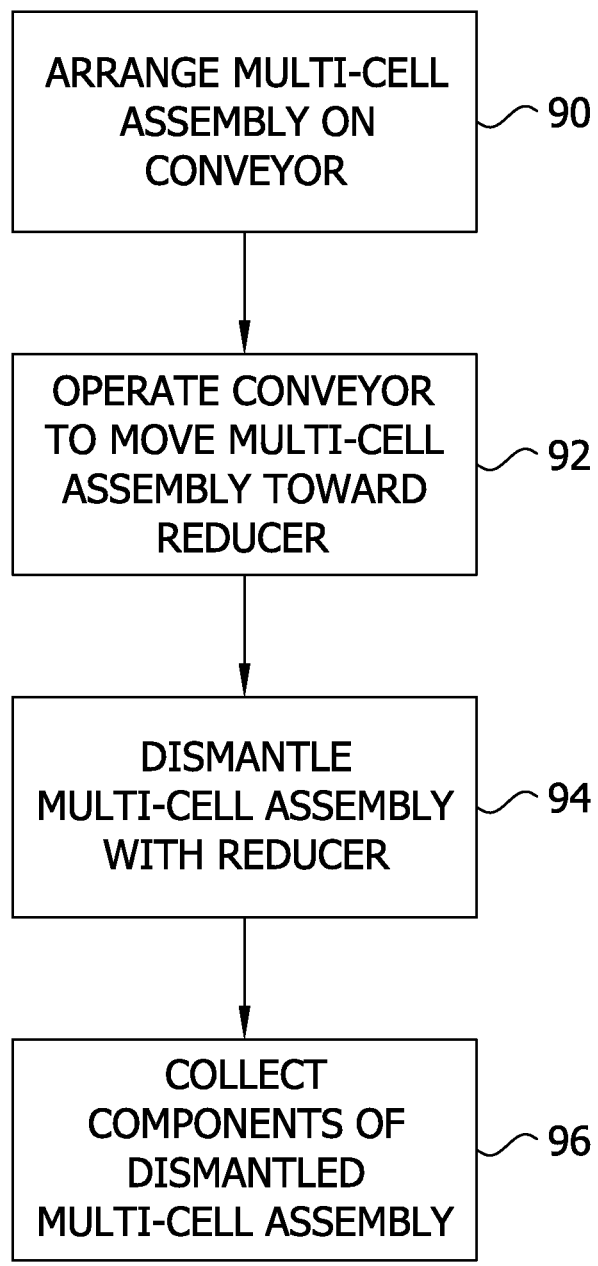
FIG. 8 is a flow diagram of a method of reducing multi-cell assemblies in to smaller pieces.
Figure 9A:
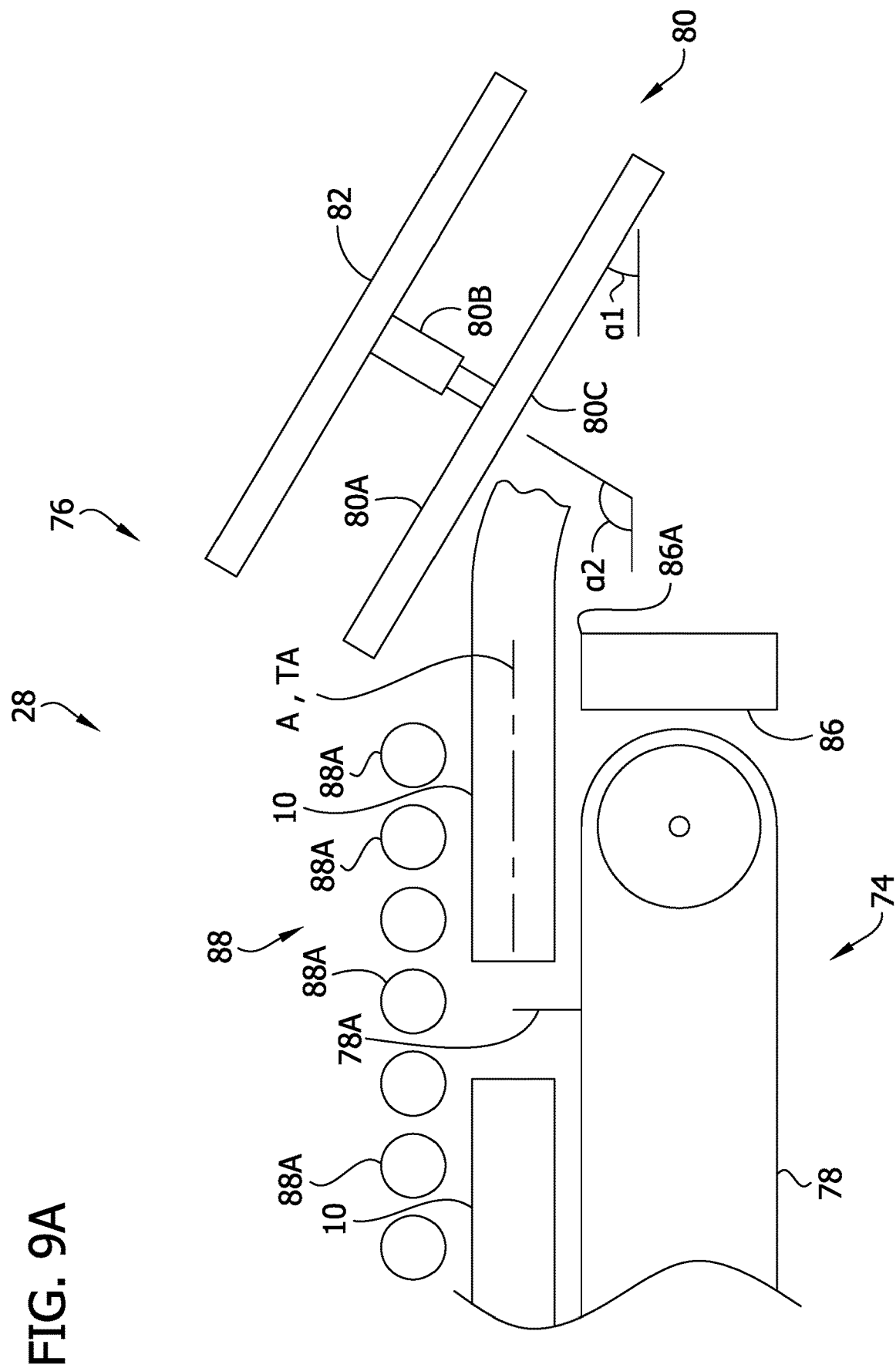
FIG. 9A is an enlarged view of a portion of FIG. 9.

Depending on the length of the multi-cell assembly 10, and depending on the operating speed of the conveyor 74 and frequency at which the ram 80 extends and retracts, the breaker 76 may fracture each multi-cell assembly into two, three, four, or more pieces, with each piece or multiple pieces being broken off from the remainder of the multi-cell assembly upon each extension of the ram. Thus, the multi-cell assembly 10 can be progressively flexed to progressively fracture the assembly into more than two pieces, such as three, four, five, six, seven, eight, nine, ten, or more pieces. The resulting pieces (e.g., smaller pieces) of the multi-cell assemblies 10 can include loose battery cells 16, clusters of battery cells, broken module housing 12 and structural components, etc. An example method of reducing multi-cell assemblies 10 into smaller pieces is shown in FIG. 8 and can include the step 90 of arranging the multi-cell assembly on the conveyor, the step 92 of operating the conveyor, the step 94 of dismantling the multi-cell assemblies with the reducer 28, and the step 96 of collecting components of the dismantled multi-cell assemblies.

In the illustrated embodiment, pieces of the multi-cell assemblies 10 falling away from the ram are collected in a container such as a Gaylord box. When the container is full of pieces, the container can be replaced with an empty container.

Other types and configurations of reducers can be used without departing from the scope of the present disclosure. For example, the reducer could be configured to cut the multi-cell assemblies 10 instead of breaking or fracturing them. Moreover, instead of including a ram that successively flexes and fractures each multi-cell assembly 10, the reducer could include a guide or chute that is curved or otherwise configured to cause progressive fracturing of the multi-cell assembly as it is forced down the chute.

Referring to FIGS. 11-16, another embodiment of a reducer (FIG. 14) for reducing the multi-cell assemblies 10 (or other components) to smaller pieces is designated by 128. The reducer 128 is similar to the reducer 28, and like components are designated by like reference numbers, plus 100. The reducer 128 includes the feeder 74, as described above, and a breaker 176 of a different configuration than the breaker 76.

Figure 14:
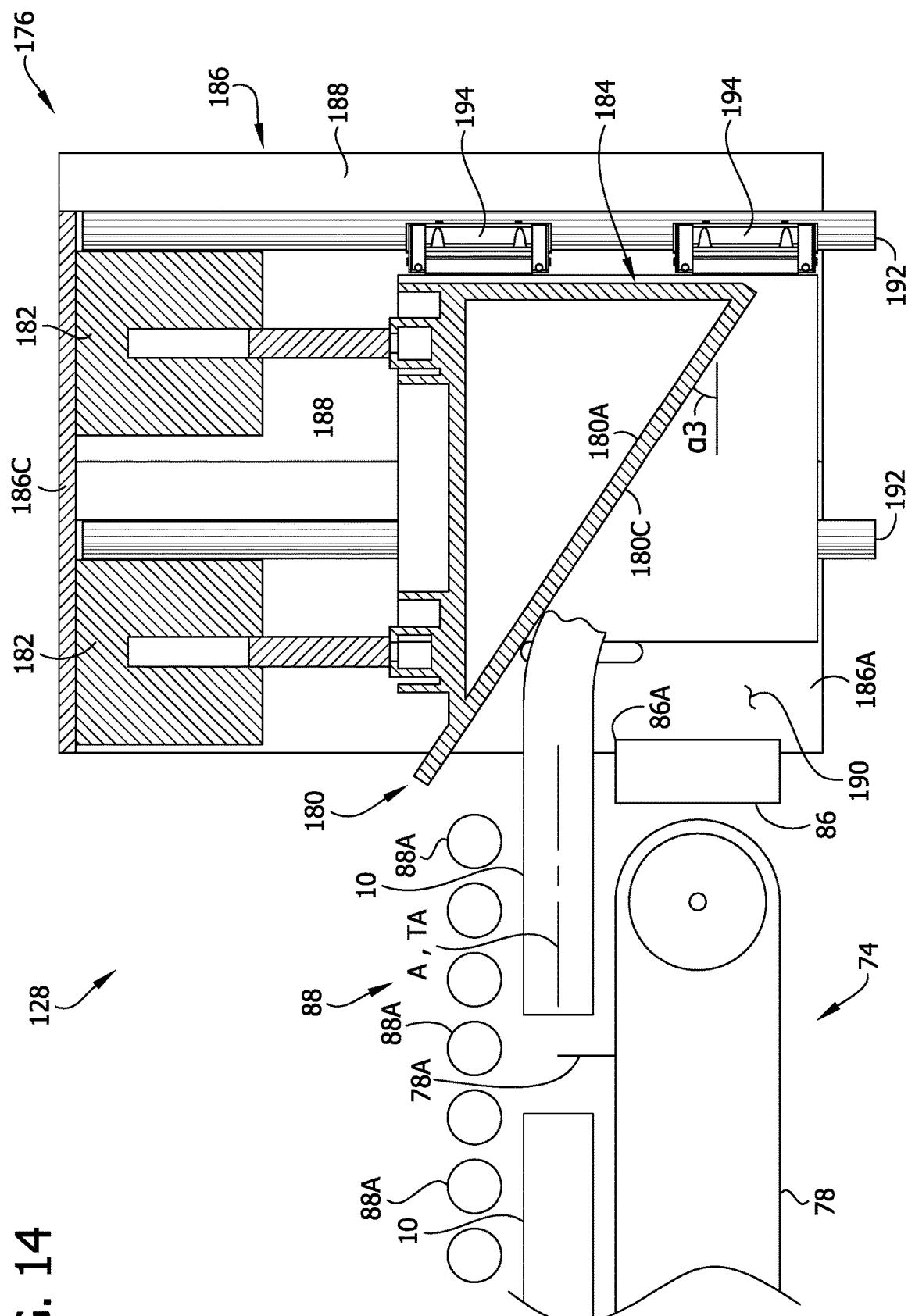
FIG. 14 is an enlarged, schematic side elevation of the reducer with the breaker shown in an extended configuration.
Figure 15:
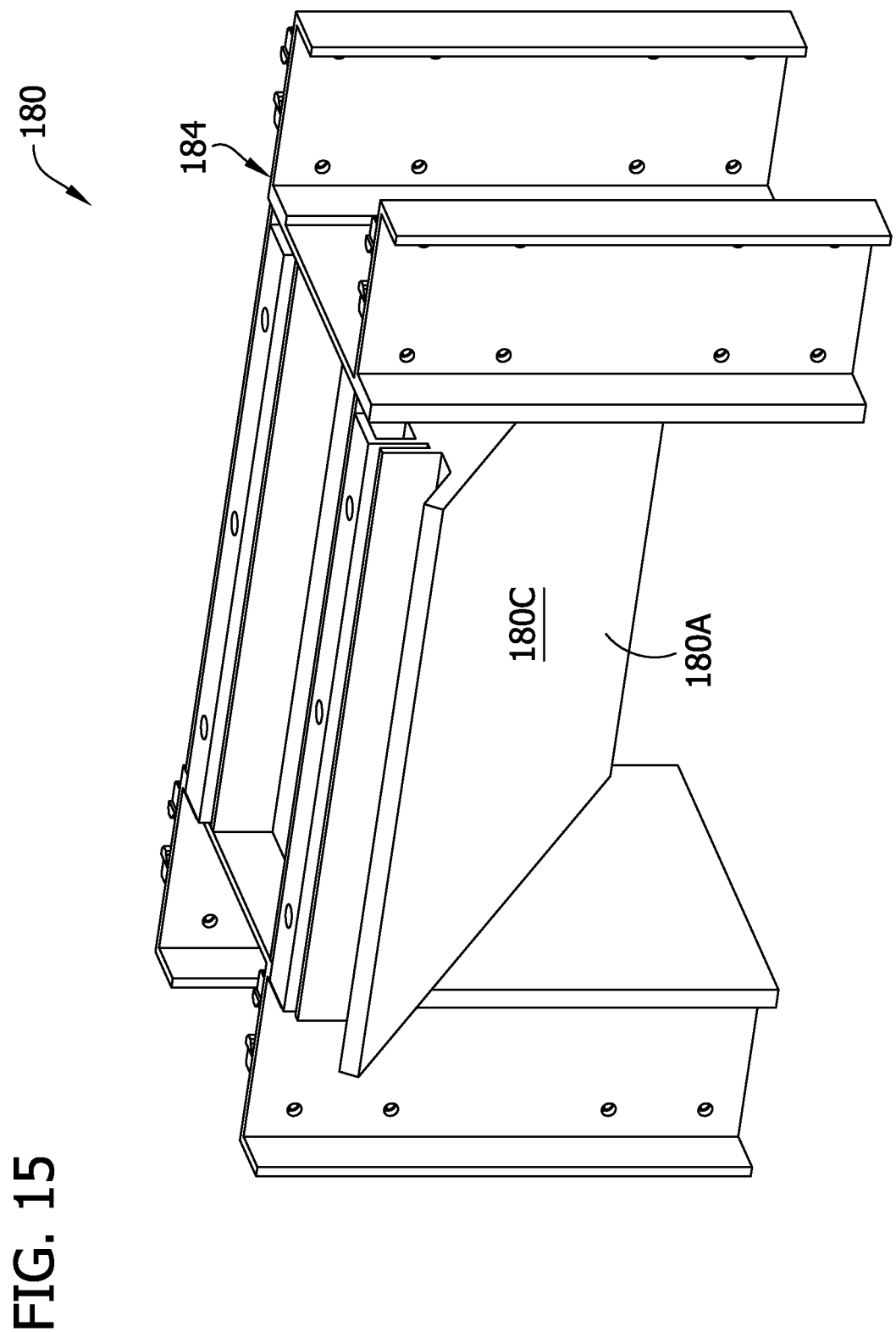
FIG. 15 is a front perspective view of a ram of the breaker.
Figure 16:
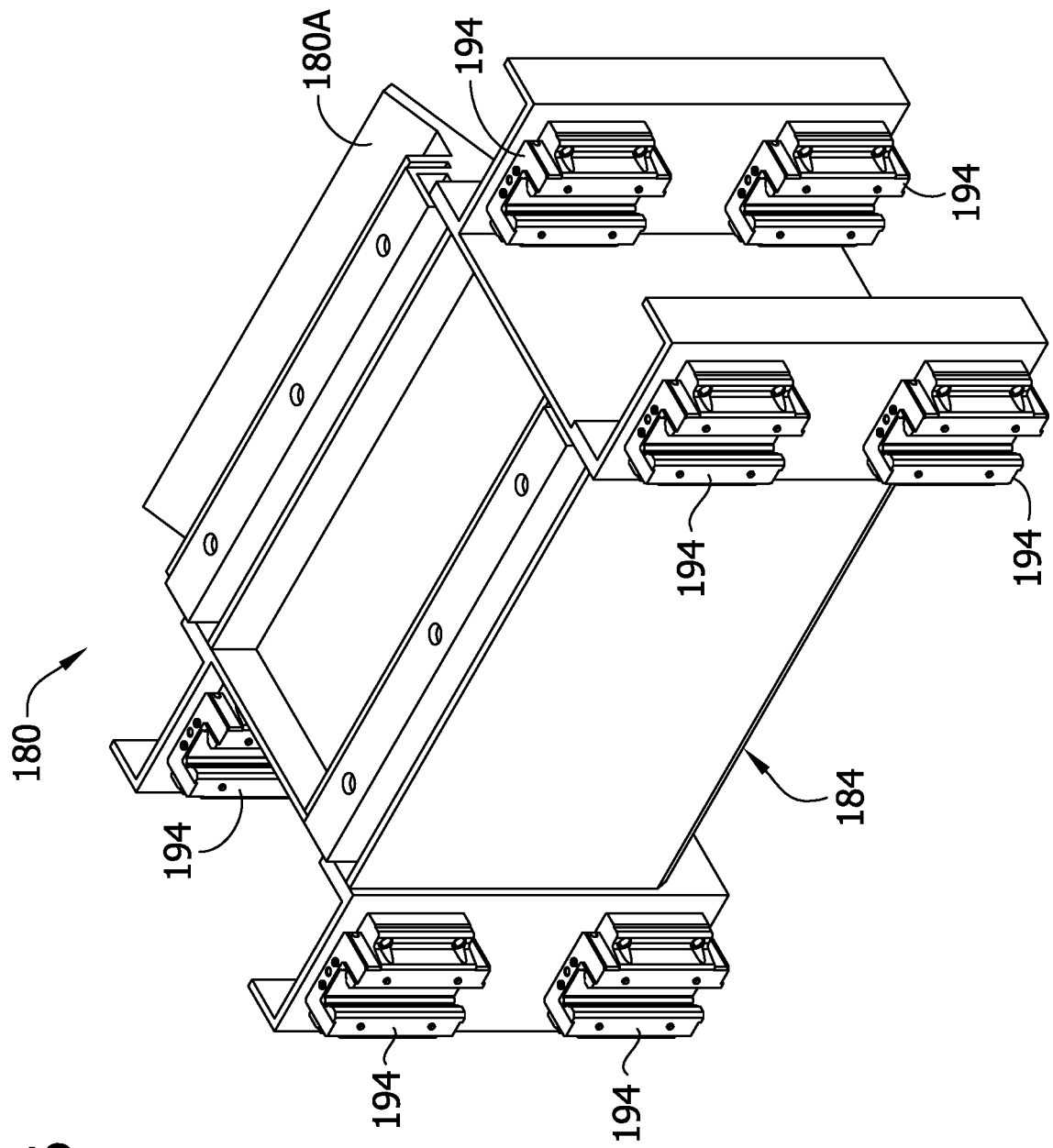
FIG. 16 is a rear perspective view of the ram.

The breaker 176 comprises a ram 180 configured to engage the multi-cell assemblies 10. The ram 180 includes a ram head 180A (e.g., rigid metal bar or plate, etc.) and at least one ram driver 182. The ram driver 182 is operatively coupled to the ram 180 to move the ram. The ram driver 182 moves the ram 180 between an initial position (FIG. 13) and an end position (FIG. 14). In the illustrated embodiment, the ram driver comprises a linear actuator 182, such as a hydraulic or pneumatic cylinder. The breaker 176 includes six linear actuators 182, although more or fewer linear actuators are within the scope of the present disclosure. The ram head 180A defines a ram surface 180C configured to engage the multi-cell assemblies 10 on the feeder 74. The ram surface 180C is arranged at an angle to the feed direction of the feeder 74. In one embodiment, the ram surface is arranged to be angled at α3 between about 15 and 35 degrees (inclusive) with respect to the feed direction (e.g., travel axis TA of the conveyor 74). The ram 180 includes a ram frame or carriage 184 supporting the ram head 180A. In the illustrated embodiment, the ram head 180A is fixed to the ram frame 184. In the illustrated embodiment, the ram frame 184 comprises a plurality of rigid metal plates or walls secured (e.g., welded) together. Other configurations of the ram frame 184 are within the scope of the present disclosure. The breaker 176 also includes the fulcrum 86 and the backing 88, as described above (FIG. 14).

The breaker 176 comprises a housing 186 supporting the ram 180. The housing 186 includes opposite first and second side walls 186A, 186B and a top wall 186C extending between the side walls. The walls 186A-C may be rigid metal plates. The housing 186 may also include a plurality of supports 188 connected to and extending inward from the first and second side walls 186A, 186B. In the illustrated embodiment, the housing 186 includes four supports 188, two extending inward from each side wall 186A, 186B. The supports 188 can be rigid metal plates. The housing 186 defines a ram receiving space 190 sized and shaped to the receive the ram 180. The ram receiving space 190 has an open front through which the multi-cell assemblies 10 can enter the ram receiving space and an open bottom through which the broken multi-cell assemblies can leave (e.g., fall) from the ram receiving space. A container disposed below the ram receiving space 190 can collect the pieces from the breaker 176.

The ram 180 is movable with respect to the housing 186 between the retracted and extended positions. In the illustrated embodiment, the ram 180 is slidably coupled to the housing 186. The housing 186 includes one or more rails 192, with the ram 180 slidably mounted on the one or more rails. The ram 180 includes slides 194 mounted on the rails 192. In the illustrated embodiment, the housing 186 includes four rails 192 and the ram 180 includes eight slides 194, two mounted on each rail. The ram 180 moves in a linear direction that is generally parallel to the longitudinal axes of the rails 192. In the illustrated embodiment, the rails 192 are oriented such that the ram 180 moves generally vertically downward toward the extended position and generally vertically upward toward the retracted position. The housing 186 locates the ram 180 with respect to the feeder 74. Other configurations of the ram 180 can be used without departing from the scope of the present disclosure.

In the illustrated embodiment, the reducer 128 comprises a flex breaker. The ram 180 of the reducer 128 is configured to engage and break apart the multi-cell assemblies 10 by flexing the multi-cell assemblies about the fulcrum 86 when the ram moves from the retracted position toward the extended position. The pressing force of the ram 180 against the forward end of the multi-cell assembly 10 results in bending (e.g., flexing) of the multi-cell assembly about the fulcrum 86 and fracturing of the multi-cell assembly (e.g., the housing 12 thereof) near the fulcrum. The force of the ram 180 against the multi-cell assembly 10 flexes the assembly (imparting tension along a top of the multi-cell assembly and compression along the bottom of the multi-cell assembly) that desirably results in breaking or fracturing of the multi-cell assembly without breaching any of the cells 16. In other words, the housing 12 and/or other structural components of the assembly 10 fracture while the cells 16 remain substantially intact. Keeping the battery cells 16 intact is desirable for the reasons stated above.

As mentioned above, the system includes a furnace 30 (e.g., rotary kiln), sometimes referred to as a calciner, for thermally decomposing the cells and/or other module components from the reducer 28, 128. Some multi-cell assemblies, such as fully assembled battery modules 10, are too large to be loaded into the furnace 30 and need to be broken up into smaller pieces by the reducer 28, 128 to be loaded into the furnace. In some circumstances, the multi-cell assemblies that are already small enough to enter the furnace 30 without being reduced may be added to the smaller pieces from the reducer 28, 128. The furnace 30 can be on-site with the other components of the system 24, or the furnace could be located off-site at a different facility. The smaller pieces from the reducer 28, 128 are directed to the furnace 30 (e.g., shipped offsite to the furnace or transferred locally to the furnace) to burn off electrolyte in the battery cells 16. The furnace 30 can include a cylinder and a housing in which the cylinder is rotatable for heating items in the cylinder at a high temperature, such as 800 degrees F. The cells 16 and pieces of the multi-cell assemblies 10 are small enough to be loaded in an entrance of the cylinder. The high temperature of the furnace 30 thermally treats or decomposes the pieces by breaching the cells 16 (causing separation of the cap 20 from the cell housing 18), burning off the electrolyte, melting the plastic, etc. The output of the furnace 30 is an inert collection of metal pieces ready for further processing. If the furnace 30 is off-site relative to the other components of the system 24, the output of the furnace can be shipped back to and received at the facility where the other components of the system are located. If the furnace 30 is off-site, the breaking of the multi-cell assemblies 10 into smaller pieces by the reducer 28 has the added benefit of generally rendering the multi-cell assemblies unidentifiable (e.g., destroyed relative to the original multi-cell assemblies, which may be identifiable as a product of a manufacturer), which may be necessary to comply with the battery recycling requirements of certain recyclers, such as the manufacturers of the multi-cell assemblies.

Referring to FIG. 3, a sorting system 100 will now be described. The sorting system 100 includes a variety of equipment configured to break down the remaining pieces of the cells and/or modules, and to sort the materials. In the illustrated embodiment, the sorting system 100 includes the shredder 32 (e.g., hammer mill or other type of shredder) for shredding the remaining pieces (e.g., a remainder of the smaller pieces) from the furnace 30 into smaller pieces. For example, the shredder 34 may include a ¼ inch bar screen such that the pieces are shredded until small enough to fall through the screen. In some embodiments, multi-cell assemblies 10 and battery cells 16 containing no electrolyte may enter the system 24 at the shredder 32 (e.g., skip the reducer 28, 128 and the furnace 30).

The sorting system 100 also includes the separator or sorter 34, which includes a plurality of components. The separator 34 is configured to sort the shredded pieces (e.g., the shredded remainder) by material type into different material groups. For example, the separator 34 separates out the shredded pieces made of plastic and groups them together. The separator 34 can do this for other materials as well, such as metals (e.g., steel, aluminum, copper, aluminum, nickel, cobalt, manganese, etc.). The separator 34 can be configured sort the shredded pieces by general material groups, such as ferrous and nonferrous metals, or by material types, such as plastic, steel, aluminum, etc.

Figure 10:
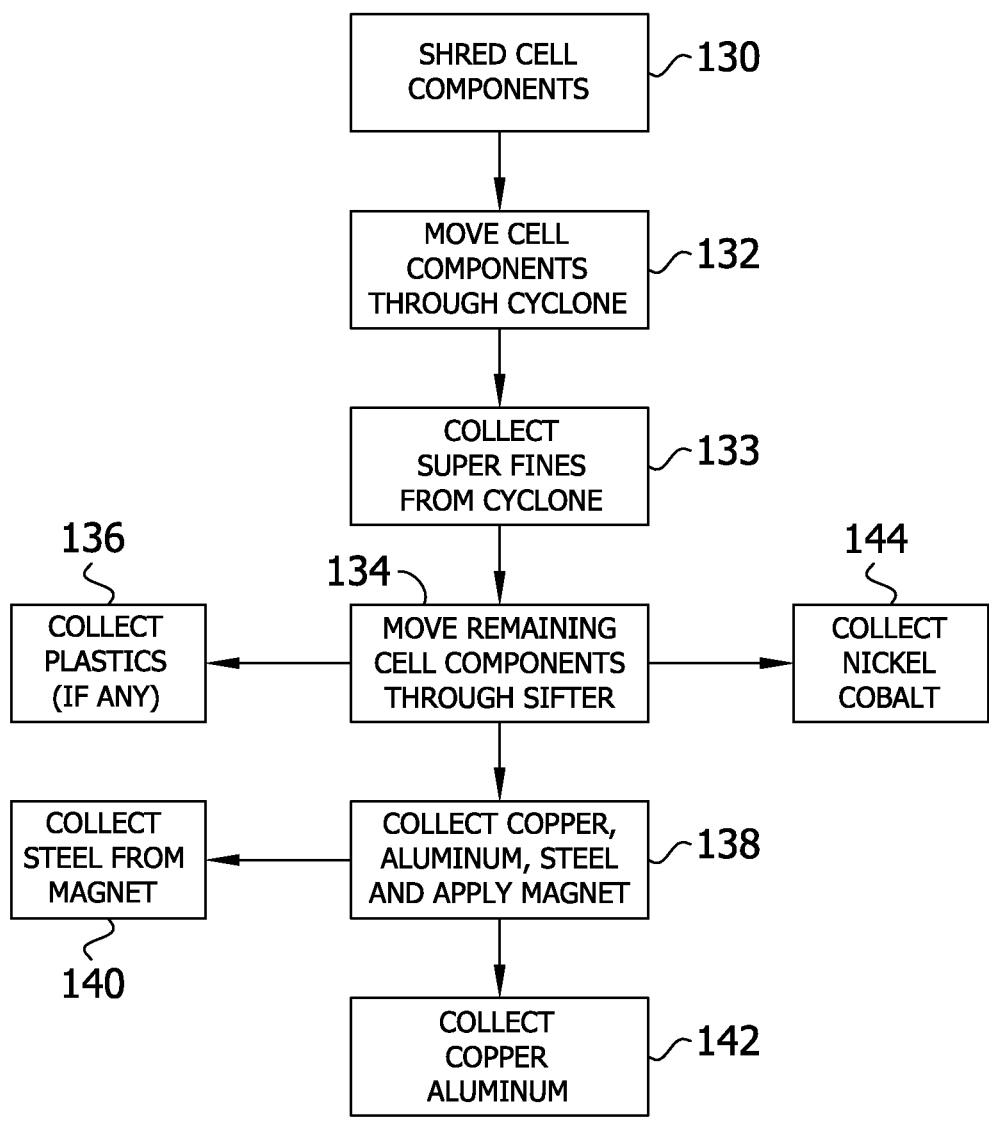
FIG. 10 is a flow diagram of method of sorting material from battery cells and/or battery modules
Figure 11:
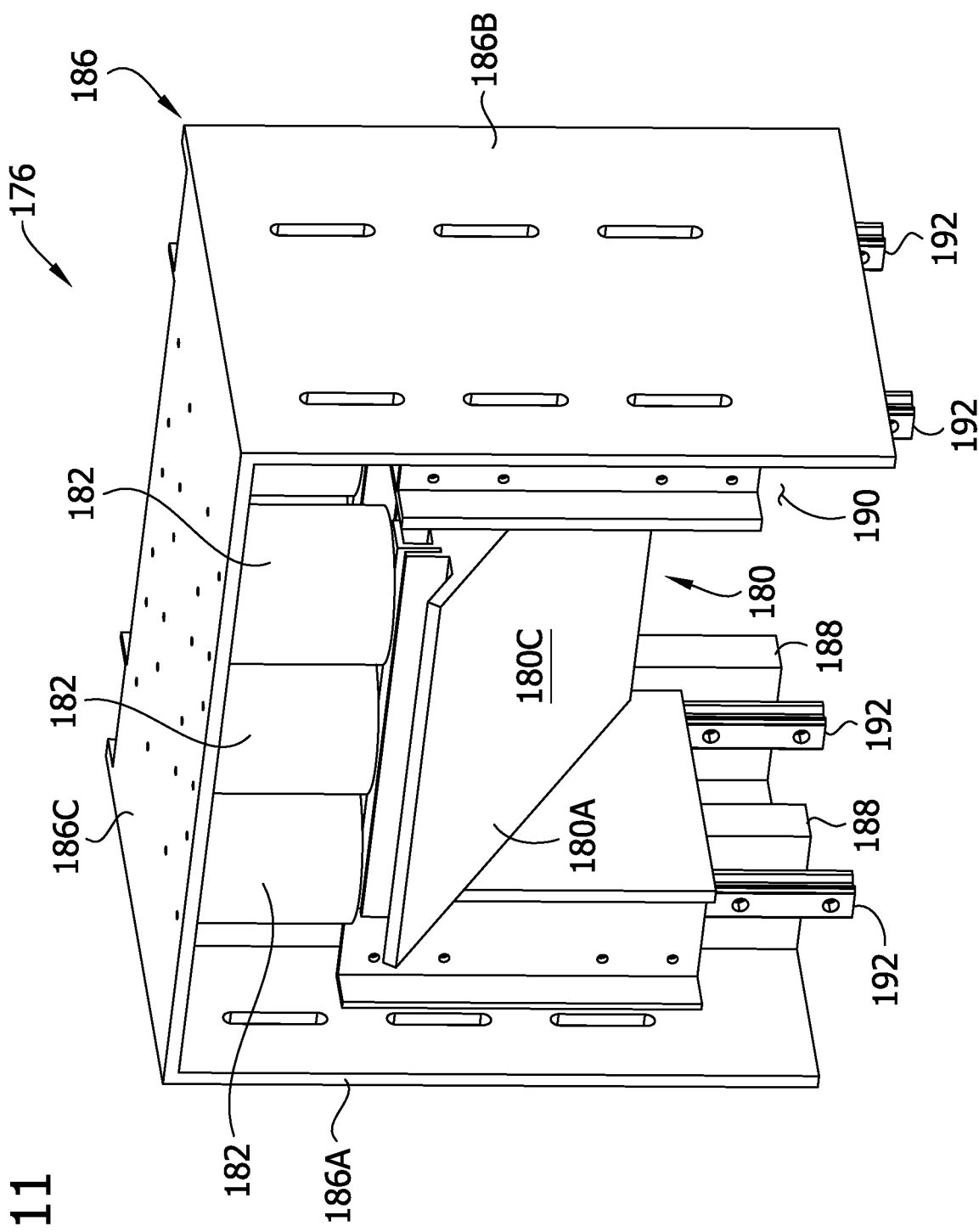
FIG. 11 is a perspective of a breaker of another embodiment of a reducer.
Figure 12:
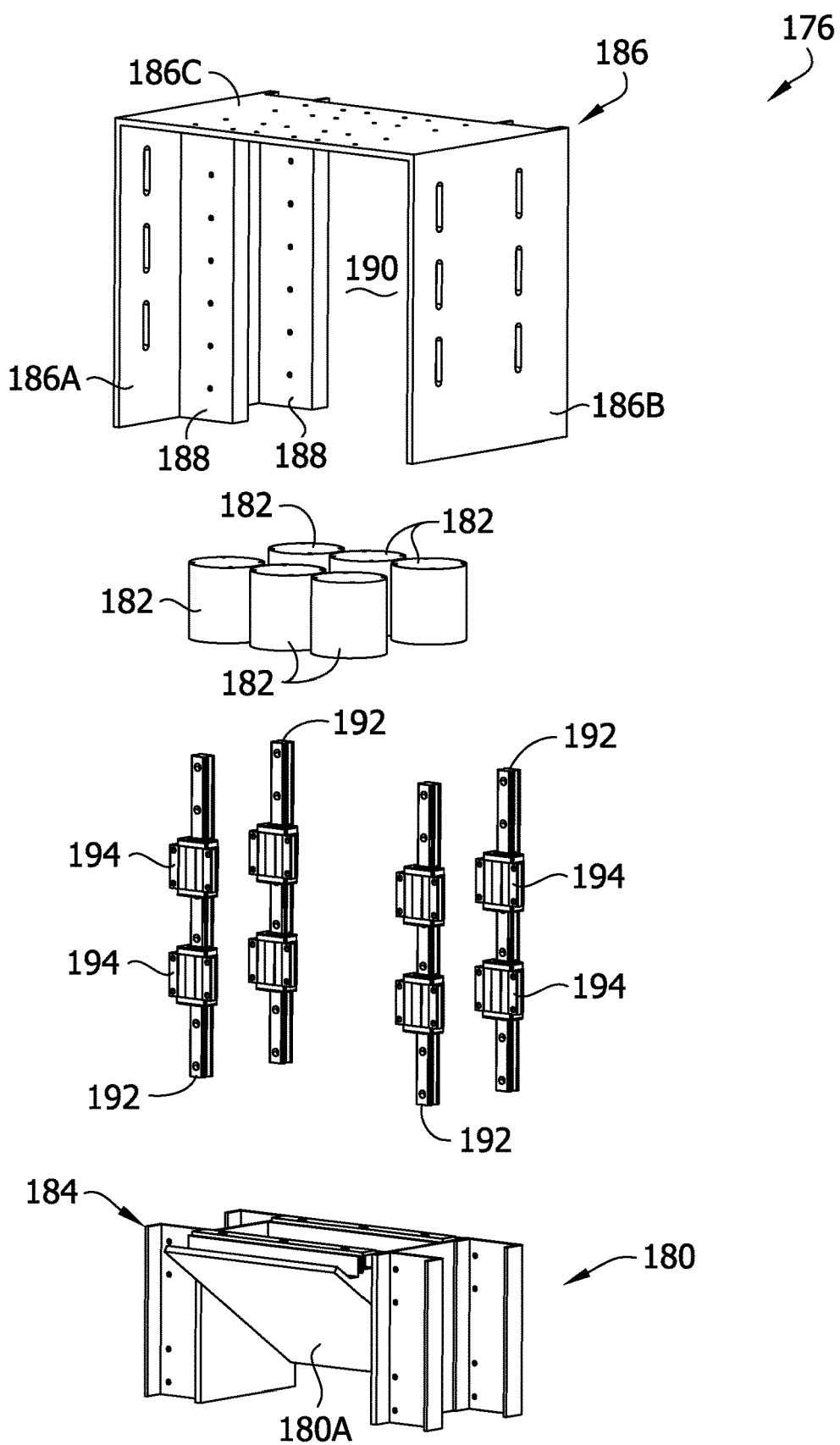
FIG. 12 is an exploded view of the breaker of FIG. 11.
Figure 13:
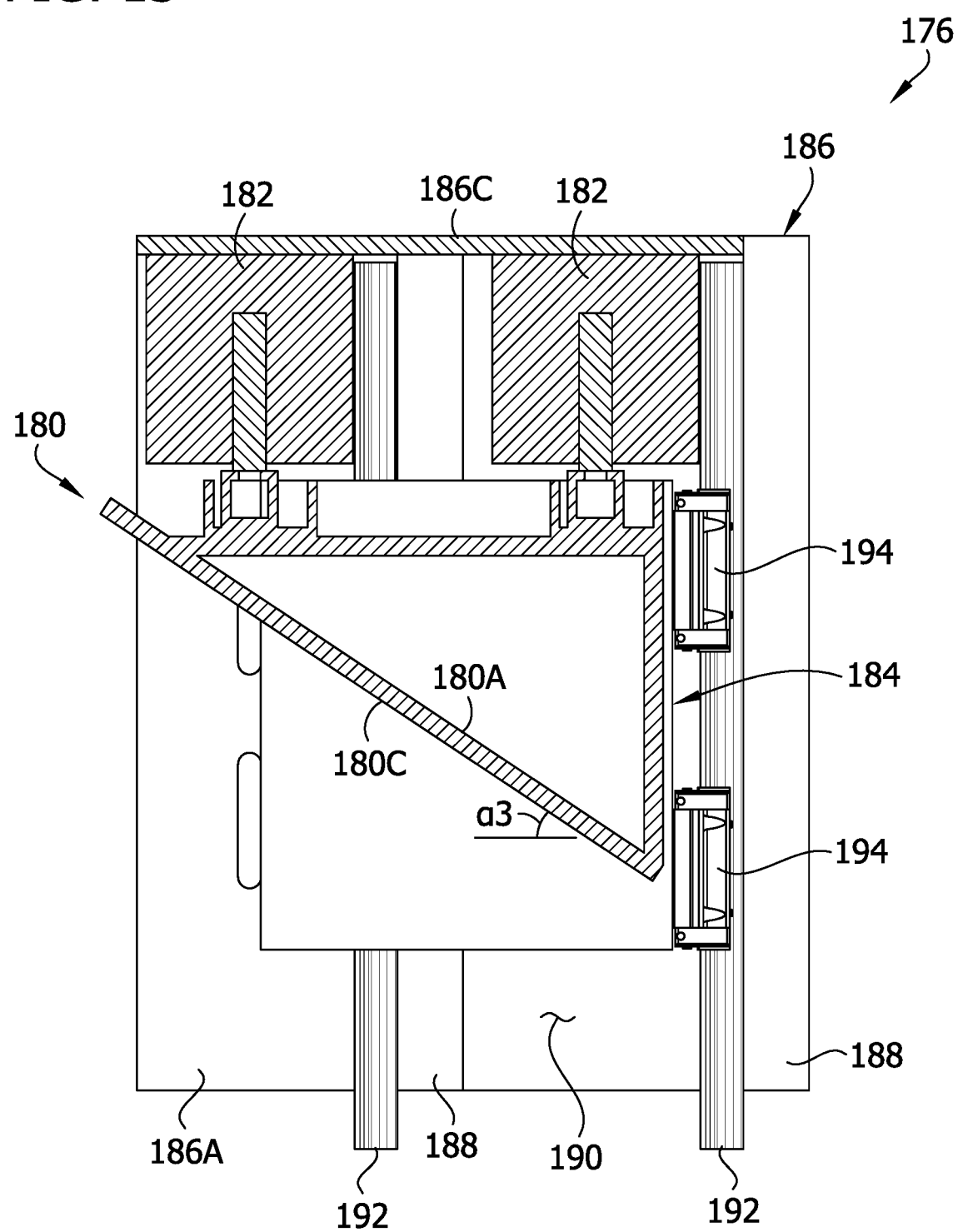
FIG. 13 is a cross section of the breaker with the breaker shown in a retracted configuration.

In the illustrated embodiment, the separator 34 includes a cyclone 102 arranged to receive pieces from the shredder 32. In another embodiment, a different type of conveyor (not shown) such as a screw conveyor (e.g., screw auger conveyor), or an endless belt conveyor, etc., is arranged to receive the pieces from the shredder 32 and transport the pieces to the cyclone 102. The shredded pieces are drawn into a vacuum intake (e.g., 8,000 cubic feet per minute) of the cyclone 102. Super fines (e.g., nickel and cobalt dust) are carried by or entrained in the air moving through the cyclone exhaust 102A, captured in one or more filters, and collected in a first container 104 (e.g., bag or silo), leaving a first remainder. The first remainder passes through the cyclone 102 and is moved by a conveyor 106 (e.g., screw auger) to a sifter 108 (e.g., oscillating sifter). The sifter 108 includes multiple (e.g., one or more) screens (e.g., sieves) of different size to separate or filter the different types of material. A first (top) screen (e.g., size 5/16 inch screen) can be configured to collect plastics from the first remainder, leaving a second remainder. Pieces caught by the top screen are output to a conveyor 110 that transfers the pieces to a bricking or pucking machine 112 for consolidating the plastic. A second screen (e.g., size 20 mesh screen) can be configured to collect metals from the second remainder, leaving a third remainder. The pieces caught by the second screen are output to a conveyor 114 having a cross-belt magnetic separator 116 for separating out ferrous metals. Ferrous metals (e.g., steel) collected by the cross-belt magnetic separator 116 are stored in a second container 118 (e.g., bin). Output of the conveyor 114 that passes the cross-belt magnetic separator 116 may include copper and aluminum, which is moved by a conveyor 120 (e.g., screw auger) to a third container 122 (e.g., silo). The third remainder (e.g., the pieces/particles passing through the first and second screens of the sifter 108) are moved by a conveyor 124 (e.g., aero-mechanical conveyor) to a third container 126 (e.g., silo) for collection. The third remainder may include nickel, cobalt, and manganese granules or powder. Accordingly, the sorting system 100 sorts plastics, copper and aluminum, steel, and relatively valuable metals such as nickel, cobalt, and manganese. These materials can be further processed (e.g., metals sent to smelter) for later use in new products. A method of operating the sorting system as described above, including steps 130-144, is illustrated in FIG. 10.

Other types or configurations of sorting systems can be used without departing from the scope of the present disclosure.

As explained above, battery cells, battery modules, and components thereof in various forms of production scrap or post-consumer battery cells or modules may be in need of recycling for metallurgical recovery. Battery cells, modules, and components thereof may enter the system 24 described above at different stages based on the status of the materials when received for recycling. For example, components of battery cells (e.g., anode, cathode, etc.) received unassembled (e.g., loose anode or cathode) or partially assembled as a cell (e.g., anode and cathode in cell housing without electrolyte), will not need to undergo deactivation or thermal decomposition and can be started at the shredder 32. In another example, individual battery cells 16, module subassemblies including battery cells or partially assembled battery modules including battery cells that are already small enough to fit into the furnace 30 will not need to be reduced by the reducer 28, 128 and can be added to the small pieces from the reducer before the small pieces are sent to the furnace. Plastics and metals of such components will be sorted by the sorting system 100 as explained above. If cells have been manufactured to the point of holding electrolyte, they will likely need to enter the process at the deactivator 26 and undergo thermal decomposition before proceeding to the sorting system 100. Multi-cell assemblies 10 (e.g., modules or partially assembled modules) will most likely include activated cells containing electrolyte and will thus start the recycling process at the deactivator 26, will likely be processed in the reducer 28, and will undergo thermal decomposition prior to sorting. If cells 16 or multi-cell assemblies 10 have been deactivated before receipt, such components could enter the recycling system at the reducer 28 or the furnace 30.

As various changes could be made in the above constructions and methods without departing from the scope of the invention, it is intended that all matter contained in the above description and shown in the accompanying drawings shall be interpreted as illustrative and not in a limiting sense. It will be apparent that modifications and variations are possible without departing from the scope of the appended claims.

What is claimed is:

1. A method of recycling one or more battery cell assemblies each containing a plurality of battery cells, the method comprising:
   reducing a battery cell assembly into smaller pieces while keeping the battery cells of the battery cell assembly intact to retain electrolyte therein, the smaller pieces including the intact battery cells;
   directing the smaller pieces to a furnace for burning off electrolyte in the battery cells;
   shredding a remainder of the smaller pieces from the furnace; and
   sorting the remainder by material type into different material groups;
   wherein reducing the battery cell assembly comprises breaking the battery cell assembly by flexing the battery cell assembly.

2. The method of claim 1, wherein flexing the battery cell assembly comprises flexing the battery cell assembly at a first region along a length of the battery cell assembly to break a first portion of the battery cell assembly and then flexing the battery cell assembly at a second region of the battery cell assembly trailing the first region to break a second portion of the battery cell assembly.

3. The method of claim 2, wherein flexing the battery cell assembly comprises forcing a ram against the battery cell assembly to cause the battery cell assembly to bend over a fulcrum to cause the battery cell assembly to break.

4. The method of claim 3, further comprising bracing the battery cell assembly to limit rotation of a trailing portion of the battery cell assembly about the fulcrum when the ram is forced against the battery cell subassembly.

5. The method of claim 1, wherein reducing the battery cell assembly into smaller pieces comprises releasing at least some of the battery cells from a housing of the battery cell assembly.

6. The method of claim 5, wherein reducing the battery cell assembly further comprises breaking the housing of the battery cell assembly.

7. The method of claim 1, further comprising discharging electrical charge from the cells of the battery cell assembly before reducing the battery cell assembly.

8. The method of claim 7, wherein discharging electrical charge from the cells of the battery cell assembly comprises discharging electrical charge from the cells of the battery cell assembly using at least one of an aqueous solution discharger or a resistor load discharger.

9. The method of claim 7, wherein sorting the remainder includes separating ferrous materials using a magnetic separator.

10. The method of claim 9, wherein sorting the remainder includes capturing fine particles of the remainder entrained in air in one or more filters.

11. The method of claim 10, further comprising directing at least one of individual battery cells, battery module subassemblies including battery cells, or partially assembled battery modules including battery cells, to the furnace, without reducing said individual battery cells, battery module subassemblies, or partially assembled battery modules before directing to the furnace.

12. The method of claim 1, wherein sorting the remainder includes filtering the remainder through one or more sieves.

13. The method of claim 1, further comprising burning off electrolyte in the battery cells with the furnace.

14. The method of claim 1, wherein sorting the remainder comprises separating fine particles from the remainder with one or more filters leaving a first remainder portion; separating plastics from the first remainder portion with a first sieve leaving a second remainder portion; separating metals from the second remainder portion with a second sieve leaving a third remainder portion; and collecting the third remainder portion.

15. The method of claim 14, further comprising separating the metals with a magnetic separator into a ferrous metal group and a non-ferrous metal group.

16. The method of claim 14, wherein separating fine particles includes entraining the fine particles in air moving through a cyclone exhaust, the cyclone exhaust including the one or more filters.

17. The method of claim 14, wherein the fine particles comprise at least one of nickel or cobalt.

18. The method of claim 17, wherein the metals comprise at least one of steel, copper or aluminum.

19. The method of claim 18, wherein the third remainder portion comprises at least one of nickel, cobalt, or manganese.

20. The method of claim 1, wherein flexing the battery cell assembly comprises moving the battery cell assembly along a conveyor toward a battery cell assembly flexer, and flexing the battery cell assembly with the battery cell flexer while the battery cell assembly is on the conveyor.

21. The method of claim 1, wherein flexing the battery cell assembly comprises:
moving the battery cell assembly forward toward a battery flexer;
flexing a forward segment of the battery cell assembly,
after flexing the first segment of the battery cell assembly, moving the battery cell assembly forward and then flexing a second segment of the battery cell assembly.

22. The method of claim 1, wherein flexing the battery cell assembly comprises moving the battery cell assembly toward a fulcrum, extending a ram to cause the battery cell assembly to flex about the fulcrum such that a first segment of the battery cell assembly breaks off from a remainder of the battery cell assembly, retracting the ram, moving the remainder of the battery cell assembly over the fulcrum, extending the ram to cause the remainder of the battery cell assembly to flex about the fulcrum such that a second segment of the battery cell assembly breaks off from the remainder of the battery cell assembly.

23. The method of claim 1, wherein flexing the battery cell assembly comprises advancing a first segment of the battery cell assembly forward toward a fulcrum, flexing the first segment of the battery cell assembly about the fulcrum, advancing a second segment of the battery cell assembly toward the fulcrum, and flexing the second segment of the battery cell assembly about the fulcrum.

24. A method for breaking down battery cell assemblies containing a plurality of battery cells, the method comprising:
breaking apart the battery cell assemblies with a reducer to reduce the battery cell assemblies to smaller pieces;
wherein breaking apart the battery cell assemblies is performed in a way to prevent breach of the battery cells to retain electrolyte in the battery cells;
wherein breaking apart the battery cell assemblies with the reducer comprises breaking the battery cell assemblies by flexing the battery cell assemblies with the reducer;
wherein flexing the battery cell assemblies with the reducer comprises flexing a first portion of a first battery cell assembly, moving the first battery cell assembly, after flexing the first portion, to locate a second portion of the first battery cell assembly to be flexed, and then flexing the second portion of the first battery cell assembly.

25. The method of claim 24, wherein the reducer includes a breaker for breaking apart the battery cell assemblies, the method further comprising feeding the battery cell assemblies with a feeder to the breaker.

* * * * *